United States Patent
Johnson (10) Patent No.: US 11,535,373 B2
(45) Date of Patent: Dec. 27, 2022

(54) METHODS AND SYSTEMS FOR REMOTE PILOTING A TWO-PILOT AIRCRAFT FOR EXTENDED FLIGHTS

(71) Applicant: B/E Aerospace, Inc., Winston-Salem, NC (US)

(72) Inventor: Glenn A. Johnson, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 474 days.

(21) Appl. No.: 16/555,139

(22) Filed: Aug. 29, 2019

(65) Prior Publication Data

US 2021/0061462 A1    Mar. 4, 2021

(51) Int. Cl.
*B64C 39/02* (2006.01)
*B64D 11/06* (2006.01)
(Continued)

(52) U.S. Cl.
CPC .......... *B64C 39/024* (2013.01); *B64D 11/064* (2014.12); *B64D 11/0689* (2013.01); *G05D 1/0044* (2013.01); *G07C 5/008* (2013.01)

(58) Field of Classification Search
CPC ..... B64C 39/024; B64C 13/00; B64D 11/064; B64D 11/0689; B64D 11/0606; B64D 2011/0076; B64D 47/00; B64D 11/0641; B64D 11/0643; G05D 1/0044; G05D 1/0011; G05D 1/0808; G07C 5/008;
(Continued)

(56) References Cited

U.S. PATENT DOCUMENTS 5,803,789 A  9/1998  Dean et al.
6,965,816 B2  11/2005  Walker
(Continued)

FOREIGN PATENT DOCUMENTS

CN    101588966 A  * 11/2009  ............. B64D 11/02
EP    3786057 A1    3/2021

OTHER PUBLICATIONS

Machine Translation: CN-101588966-A (year:2009).*
Search Report for European Application No. 19215092 dated Jul. 1, 2020, 7 pages.

*Primary Examiner* — Anne Marie Antonucci
*Assistant Examiner* — Connor L Knight
(74) *Attorney, Agent, or Firm* — Suiter Swantz pc llo (57) ABSTRACT

A system for both onboard piloting and remote piloting an aircraft having thereon at least one onboard pilot includes an aircraft having an onboard flight control system, onboard flight control devices, and onboard condition indicators mounted proximal the pilot seat. A remote flight control system, in electronic communication with the onboard flight control system, includes remote flight control devices and remote condition indicators. At least in a remote piloting mode, the onboard flight control system transmits flight and aircraft condition-related signals to the remote flight control system, receives flight control signals from the remote flight control system, and actuates, according to the flight control signals received from the remote flight control system, onboard actuators thereby remote piloting the aircraft. In the remote piloting mode, the aircraft may be cooperatively piloted by a remote pilot and at least one alert onboard pilot as another onboard pilot rests.

14 Claims, 4 Drawing Sheets

(51) Int. Cl.
*G05D 1/00* (2006.01)
*G07C 5/00* (2006.01)

(58) Field of Classification Search
CPC ............... G08G 5/0052; G08G 5/0013; B60N
2002/0272; B60N 2/22; B60N 2/20;
B60N 2002/948; B60N 2/919; B60N
2/0248; B60N 2002/0268; B60N 2/42745;
B60R 21/01554; B60R 2011/0015
See application file for complete search history.

(56) References Cited

U.S. PATENT DOCUMENTS

| | | | |
|---|---|---|---|
| 7,099,752 B1* | 8/2006 | Lenell | G05D 1/0027 |
| | | | 244/189 |
| 7,156,344 B1* | 1/2007 | Guering | B64C 1/0683 |
| | | | 244/118.5 |
| 7,614,584 B2* | 11/2009 | Retz | B64D 11/00 |
| | | | 244/118.6 |
| 2006/0032978 A1 | 2/2006 | Matos et al. | |
| 2010/0030406 A1* | 2/2010 | Christophe | B64D 11/0689 |
| | | | 244/118.6 |
| 2010/0288881 A1* | 11/2010 | Helfrich | B64D 11/00 |
| | | | 244/118.6 |
| 2011/0127380 A1* | 6/2011 | Orgerie | B64D 47/02 |
| | | | 244/118.5 |
| 2017/0355282 A1* | 12/2017 | Zouzal | B60N 2/0232 |
| 2018/0290729 A1* | 10/2018 | Shavit | G08G 5/0056 |
| 2020/0047692 A1* | 2/2020 | Park | G06Q 30/0283 |

* cited by examiner

METHODS AND SYSTEMS FOR REMOTE PILOTING A TWO-PILOT AIRCRAFT FOR EXTENDED FLIGHTS

BACKGROUND

The advent of current generation single-aisle aircraft that can fly further than 4,500 nautical miles, in a flight time of approximately 10.5 hours, raises the issue that flight crewmen can actively pilot an aircraft for time periods limited by country or airline operator standards. For example, two men can only legally fly for eight hours in the United States. Such aircraft are being developed as they are very cost effective in terms of cost per mile to operate. Thus, aircraft entering use are capable of exceeding regulations set by, for example, the Federal Aviation Administration (FAA) of the United States and other aviation authorities abroad that dictate flight time limitations for one or two pilot crews.

Adding another onboard pilot to cover additional flight time would involve modifying the cockpit from a two-person layout. Where additional seats are already provided, they are typically smaller flip out seats located away from the flight controls and are smaller than full pilot seats or passenger seats and are not designed to be occupied for long periods of time.

Additional flight crew members could be accommodated in the main cabin for in-flight resting. However, this would reduce the space available for revenue service. Additionally, a third flight crew member would add cost and further reduce revenue.

Accordingly, operational and equipment solutions are needed to efficiently and safely pilot long-range aircraft.

SUMMARY OF THE INVENTIVE ASPECTS

To achieve the foregoing and other advantages, the inventive aspects disclosed herein are directed to a system for both onboard piloting and remote piloting an aircraft having thereon at least one onboard pilot. The system includes an aircraft having an onboard first pilot seat, onboard sensors, onboard actuators, and an onboard flight control system, the onboard flight control system including onboard flight control devices and onboard condition indicators mounted proximal the first pilot seat. A remote flight control system is in electronic communication with the onboard flight control system by way of a two-way communication channel including at least one wireless segment. The remote flight control system includes remote flight control devices and remote condition indicators. The onboard flight control system is operative to receive condition-related inputs from the onboard sensors, to activate the onboard condition indicators according to the received condition-related inputs, and: at least in an onboard piloting mode, to actuate the onboard actuators according to the onboard flight control devices, thereby onboard piloting the aircraft; and at least in a remote piloting mode, transmit the condition-related signals to the remote flight control system, to receive flight control signals from the remote flight control system, and to actuate, according to the flight control signals received from the remote flight control system, the onboard actuators thereby remote piloting the aircraft.

In some embodiments, the first pilot seat is adjustable between an upright position and a reclined position, and the onboard flight control system is operative in the remote piloting mode upon the first pilot seat being adjusted to the reclined position.

In some embodiments, the aircraft further includes an onboard second pilot seat adjustable between an upright position and a reclined position. The onboard flight control system is operative in the remote piloting mode upon the second pilot seat being disposed in the reclined position.

In some embodiments, the first pilot seat is disposed in the reclined position thereof and the second pilot seat is disposed in the reclined position thereof at exclusive alternating times.

In some embodiments, the remote flight control system includes at least one display on which the remote condition indicators are graphically displayed.

In some embodiments, the aircraft further includes an onboard second pilot seat adjustable between an upright position and a reclined position, wherein the first pilot seat is adjustable between an upright position and a reclined position, and wherein the aircraft further includes a partition wall deployable between the first pilot seat and second pilot seat.

In some embodiments, the partition wall stows automatically as either of the first pilot seat and second pilot seat is adjusted from the reclined position thereof to the upright position thereof.

In some embodiments, the aircraft further includes an onboard second pilot seat, and, at least in the remote piloting mode, the remote pilot is simulated as placed into the aircraft by a virtual reality (VR) presentation viewable at the second pilot seat.

In some embodiments, the aircraft further includes an onboard second pilot seat, and the remote piloting system is used to extend the range of the aircraft by permitting a first pilot in the first pilot seat and a second pilot in the second pilot seat to alternately rest as a third pilot at the remote flight control system pilots the aircraft cooperatively with the non-resting one of the first pilot and second pilot.

In some embodiments, the first pilot seat includes a seat position sensor in electronic communication with the onboard flight control system, and the onboard flight control system is operative to alert the remote flight control system when the onboard pilot seat is adjusted to a reclined position.

In another aspect, the inventive concepts disclosed herein are directed to an aircraft for both onboard piloting and remote piloting. The aircraft includes an onboard first pilot seat, multiple onboard sensors, multiple onboard actuators, and an onboard flight control system, which includes onboard flight control devices and onboard condition indicators mounted proximal the first pilot seat. The onboard flight control system is in electronic communication with a remote flight control system by way of a two-way communication channel including at least one wireless segment. The remote flight control system includes remote flight control devices and remote condition indicators. The onboard flight control system is operative to receive condition-related inputs from the onboard sensors, to activate the onboard condition indicators according to the received condition-related inputs, and, at least in an onboard piloting mode, to actuate the onboard actuators according to the onboard flight control devices, thereby onboard piloting the aircraft. The onboard flight control system is operative, at least in a remote piloting mode, to transmit the condition-related signals to the remote flight control system, to receive flight control signals from the remote flight control system, and to actuate, according to the flight control signals received from the remote flight control system, the onboard actuators thereby remote piloting the aircraft.

In some embodiments, the first pilot seat is adjustable between an upright position and a reclined position, and the onboard flight control system is operative in the remote piloting mode upon the first pilot seat being adjusted to the reclined position.

In some embodiments, an onboard second pilot seat is adjustable between an upright position and a reclined position, and, the onboard flight control system is operative in the remote piloting mode upon the second pilot seat being disposed in the reclined position.

In some embodiments, the first pilot seat is disposed in the reclined position thereof and the second pilot seat is disposed in the reclined position thereof at exclusive alternating times.

In some embodiments, an onboard second pilot seat is adjustable between an upright position and a reclined position, the first pilot seat is adjustable between an upright position and a reclined position, and the aircraft further includes a partition wall deployable between the first pilot seat and second pilot seat.

In some embodiments, the partition wall stows automatically as either of the first pilot seat and second pilot seat is adjusted from the reclined position thereof to the upright position thereof.

In some embodiments, the aircraft includes an onboard second pilot seat, and, at least in the remote piloting mode, the remote pilot is simulated as placed into the aircraft by a virtual reality (VR) presentation viewable at the second pilot seat.

In some embodiments, the aircraft includes an onboard second pilot seat, and, the remote piloting system is used to extend the range of the aircraft by permitting a first pilot in the first pilot seat and a second pilot in the second pilot seat to alternately rest as a third pilot at the remote flight control system pilots the aircraft cooperatively with the non-resting one of the first pilot and second pilot.

In some embodiments, the first pilot seat includes a seat position sensor in electronic communication with the onboard flight control system, and, the onboard flight control system is operative to alert the remote flight control system when the onboard pilot seat is adjusted to a reclined position.

In some embodiments, the first pilot seat includes a backrest pivotally adjustable from an upright position to a fully reclined approximately horizontal position.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION OF THE INVENTIVE ASPECTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Operational and equipment solutions are provided to efficiently and safely pilot long-range aircraft. To address this issue, an aircraft is remotely piloted, for example by a remote ground-based pilot. For example, a remote pilot can assume a copilot role, as one of two onboard pilots rests, and the alert onboard pilot assumes a primary pilot role. In effect, a third pilot is able to fly the aircraft, from afar, in cooperation with the onboard crew, enabling onboard pilots to rest one at a time. Even as an onboard pilot rests, two crew members, an onboard pilot and a remote pilot, are in control of the aircraft. The onboard pilot seats may be configured like premium class seating, such that the seats recline even to fully reclined or layback positions to attain true sleep. Such seats will achieve their fully reclined positions in a space similar to existing seats, thus requiring little cockpit redesign.

Figure 1:
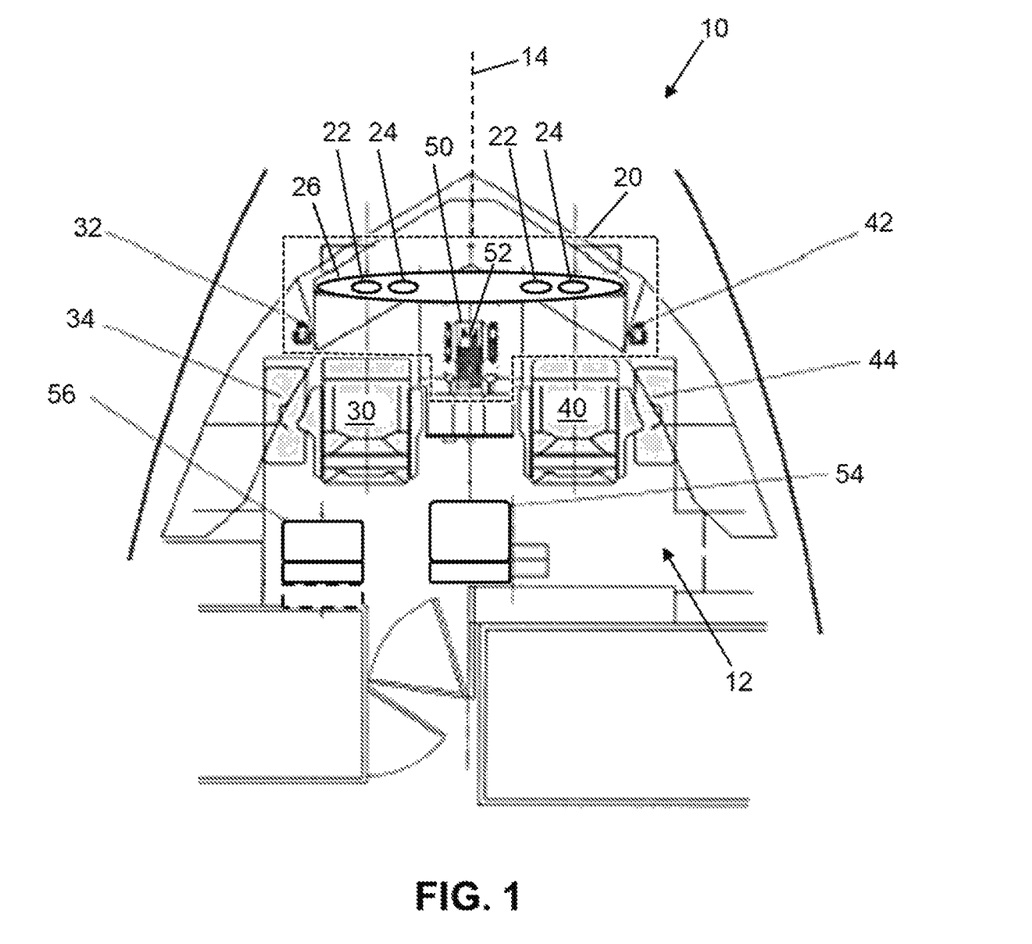
FIG. 1 is a plan view of a two-pilot cockpit layout of an aircraft according to the present disclosure.

Turning to FIG. 1, an aircraft 10 having a two-pilot cockpit 12 is shown as having two pilot seats longitudinally aligned and spaced from each other, each on a respective side of a central longitudinal axis 14 of the aircraft. The pilot-accessible forward components of an onboard flight control system 20 are emphasized by dashed line. The flight control system 20 includes flight condition indicators 22 (FIGS. 1,5), aircraft system condition indicators 24, and flight control devices for use by the pilots in controlling the aircraft. The flight control system includes an instrument panel 26 forward of the pilot seats, where many of the condition indicators and flight control devices are mounted to be readily accessible to pilots. The flight control system can have elements arranged and distributed elsewhere in the cockpit and aircraft.

Redundancy in the flight instruments and controls of the system permit either pilot to control the aircraft. By convention, the first or left-side pilot seat 30 is typically assigned to a flight captain, and the second or right-side pilot seat 40 is typically assigned to a first officer. As a flight proceeds, the roles the two onboard pilots assume may be exchanged and shared as they cooperatively control the aircraft. Thus, the first pilot seat 30 and second pilot seat 40 are referenced in the drawings and in the following descriptions without limitation imposed upon what role, for example as primary pilot or copilot, any pilot assumes in any seat at any time.

Figure 2:
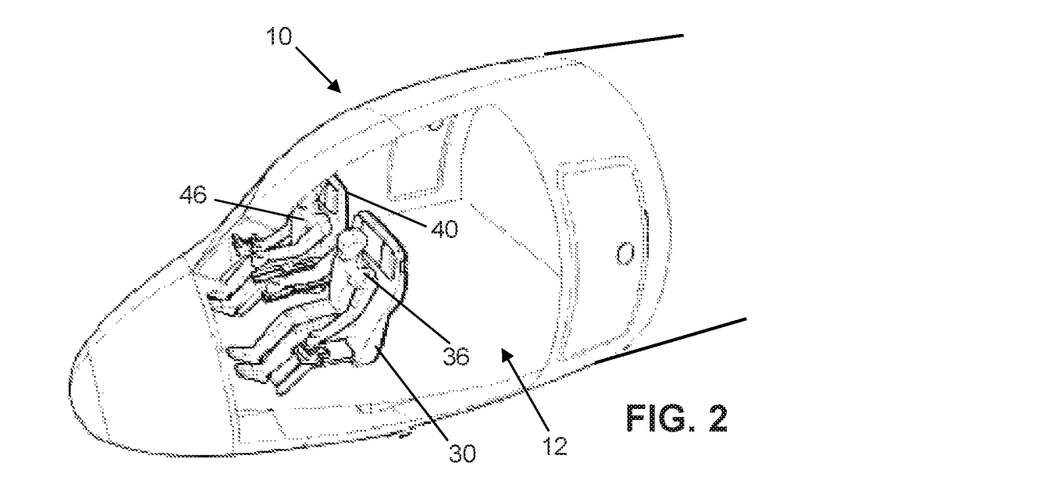
FIG. 2 is a perspective view of a two-pilot aircraft cockpit, as in FIG. 1 or in another aircraft, shown in normal flight operation.

A captain side joystick 32, a captain navigation bag 34, a first officer side joystick 42, and a first officer navigation bag 44, are accordingly assigned at the left and right sides of the pilot seating arrangement. A central pedestal 50, between the pilot seats, serves as a base on which actuatable thrust controllers and other onboard flight control devices 52 are accessible to, and shared by, the first pilot 36 and second pilot 46 (FIG. 2). Flight control devices 52 are broadly considered in these descriptions to include the joysticks 32 and 42 and other devices that adjust the speed, orientation, trajectory of the aircraft and other parameters by which flight is adjusted and controlled.

What additional seating is provided in the cockpit 12 may be of the cabin attendant seating (CAS) variety, meaning the third occupant seat 54 and fourth occupant seat 56 are smaller than the pilot seats, and do not, or only minimally, adjust and recline. The third occupant seat 54, aft or rearward of the pedestal 50 offers high visibility of the flight panel(s) 26 for observation.

In FIG. 2, a two-pilot cockpit 12 is shown during normal flight operation, in which an alert first pilot 36 occupies the first pilot seat 30, and an alert second pilot 46 occupies the second pilot seat 40. The aircraft 20 represented in FIG. 2 may be the same model as the aircraft represented in FIG. 1, or another aircraft. Thus, the aircraft represented in FIG. 1 is a non-limiting example. The two pilots (FIG. 2) cooperatively control the aircraft 10 in this mode. The distance and corresponding duration of the flight may exceed comfort or regulatory limits of the pilots, and rest may be needed accordingly. The maximum flight time for a pilot during a day is limited by regulation in some aeronautical jurisdictions, for example to nine hours, and eight hours at night. Flight duty period limits, accumulating both rest and alert times, can be higher, for example ranging from nine to fourteen hours, depending on how many segments are flown and the start time of the pilot's duty day.

Figure 3:
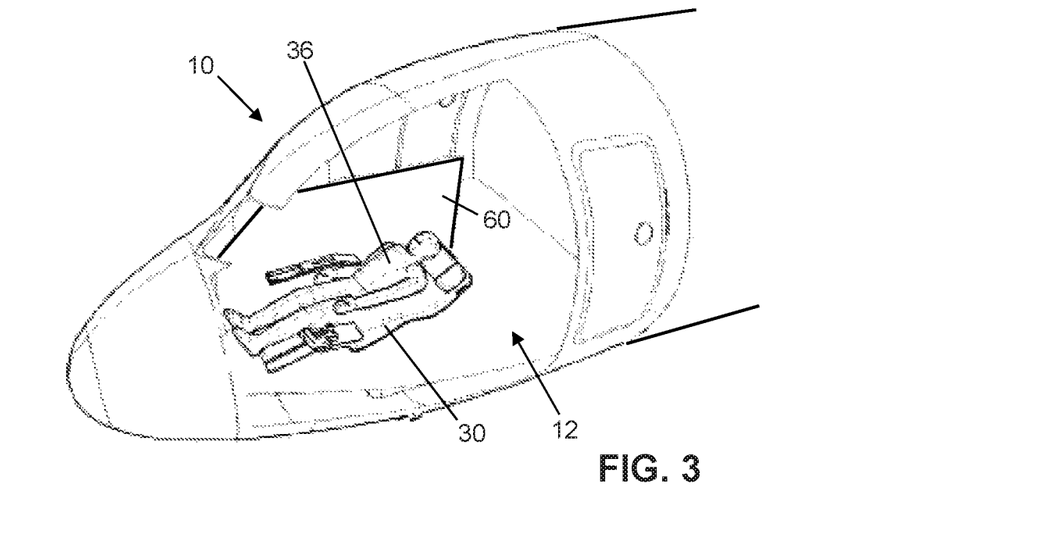
FIG. 3 is a perspective view of the two-pilot cockpit of FIG. 2 shown with a pilot resting on a reclined seat in a screened privacy area.

To provide a rest period for an onboard pilot, the pilot seats according to these descriptions may recline, for example through a range of reclined positions from their upright positions (FIG. 2) for use by alert pilots to fully reclined or layback positions to attain true sleep, as illustrated for the first pilot seat 30 in FIG. 3, in which the first pilot 36 is in a lying rest position. Accordingly, the backrest portion 37 of the seat 30 is pivotally lowered (FIG. 4) from its upright position of FIG. 2, and the legrest portion 38 of the seat is pivotally raised in FIG. 4 from its forward reclined position of FIG. 2. The seat bottom 39 may articulate with movements of the backrest to avoid binding or pinching. In the fully reclined or layback positions, the backrests are pivotally lowered to horizontal positions, approximately aligned with the seat bottoms, and the legrests are pivotally raised.

Figure 4:
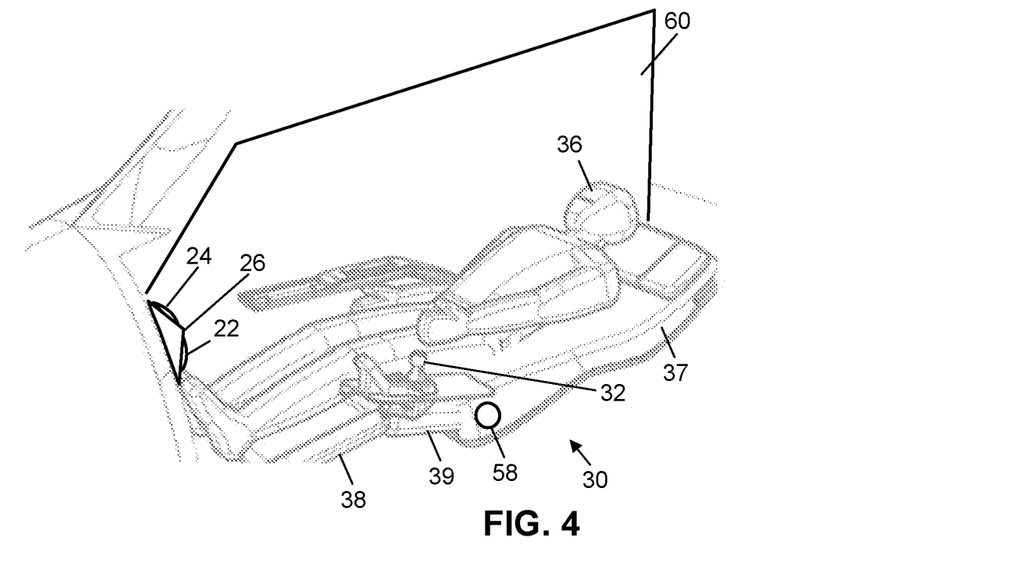
FIG. 4 is an enlarged view of the resting pilot, reclined seat, and screened privacy area of FIG. 3.

A partition wall 60 is shown in FIGS. 3 and 4 as deployed between the first pilot seat 30 and second pilot seat, providing a screened privacy are to the resting pilot. The partition wall 60 deploys manually or automatically as either pilot seat is reclined, for example to the fully reclined position. The partition wall 60 stows manually or automatically as either reclined pilot seat is returned to its upright position. In the stowed condition, the partition wall 60 is discretely stowed in a compact low-profile configuration or position. The partition wall 60 may be a thin rollable screen or sheet stowed on a spool or reel. Other wall constructions are within the scope of these descriptions.

The flight crew member on the first pilot seat 30 may be resting to comply with maximum flight time limits set by aeronautical authorities, or airline operators; or, the crew member may be resting by personal choice. The reclining pilot seats achieve their fully reclined positions in a space within the dimensions of the cockpit 12, and the partition wall 60 provides a perception of privacy to the resting occupant of the first pilot seat 30 while occupying very little space in both the deployed condition of FIGS. 3-4 and the stowed condition of FIG. 2.

Figure 5:
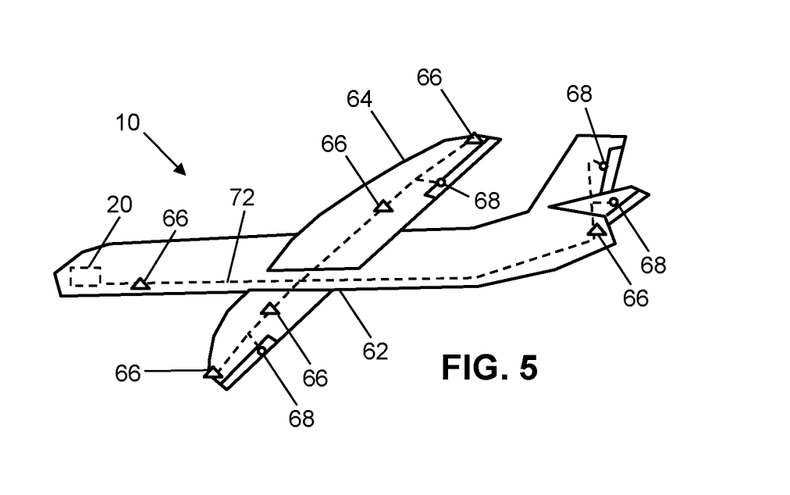
FIG. 5 is a representation of the aircraft of FIGS. 2-4, shown for more complete diagrammatic illustration of onboard flight control system components, particularly for elements distributed through the fuselage and wings.

FIG. 5 represents the aircraft 10 of FIGS. 2-4 in a more complete illustration to emphasize elements of the onboard flight control system components distributed through the fuselage 62 and wings 64. The aircraft includes onboard sensors 66, onboard actuators 68, and an onboard flight control system 20. The onboard sensors 66 can include, as non-limiting examples, flight condition sensors including air speed sensors, altitude sensors, temperature sensors, and other sensors that detect flight conditions outside and inside the aircraft 10. The onboard sensors 66 can also include aircraft system condition sensors including engine condition sensors, fuel level sensors, sensors that detect the status or condition of wing flaps and landing gear, and other sensors.

The onboard actuators 68 can include, as non-limiting examples, actuators that adjust flight control surfaces such as the wing flaps, the vertical stabilizer rudder(s), and the horizontal stabilizer elevator(s). The onboard actuators 68 further include actuators by which the aircraft 10 is controlled in both flight and ground movement. Thus, the onboard actuators 68 can control the landing gear, and both ground and air braking systems. The onboard actuators 68 can also include devices that control engine speed and thrust. Thus, the aircraft 10 is piloted by control of the onboard actuators 68. Actuators are broadly referenced to include mechanically, electrically, and fluidly driven devices and mechanisms.

The onboard fight control system 20 is in operative communication with the onboard sensors 66 to receive condition-related inputs from the onboard sensors 66 and to activate the onboard condition indicators according to the received condition-related inputs. As the onboard sensors 66 include flight condition sensors and aircraft system condition sensors, the onboard condition sensors accordingly include flight condition indicators 22 (FIGS. 1 and 5) and aircraft system condition indicators 24 that respectively indicate flight and system conditions to the flight crew. The onboard flight control system 20 is in operative communication with the onboard actuators 68 to control and actuate the onboard actuators 68 according to the onboard flight control devices 52, thereby onboard piloting the aircraft. Dashed lines generally referenced in FIG. 5 as links 72 by which the onboard flight control system 20 is in operative communication with onboard sensors 66 and onboard actuators 68 are broadly considered to include electrical, mechanical, fluid, and optical links by which onboard sensors provide inputs to, and onboard actuators receive outputs from, the onboard flight control system 20. Onboard sensors 66, actuators 68, and links 72 therebetween, and the onboard flight control system 20, may have redundancies for assurance of flight control operations in the event one device or one system of redundant parallel devices and systems is inoperative or faulty.

Piloting is generally conducted by at least one onboard pilot. The onboard flight control system 20 is operative to receive condition-related inputs from the onboard sensors 66, to activate the onboard condition indicators according to the received condition-related inputs, and, in an onboard piloting mode, to actuate the onboard actuators 68 according to the onboard flight control devices, thereby onboard piloting the aircraft 10. Control of the aircraft 10 is not necessarily exclusively executed by a single pilot of the two onboard pilots, who may cooperatively control the aircraft in the onboard piloting mode.

Figure 6:
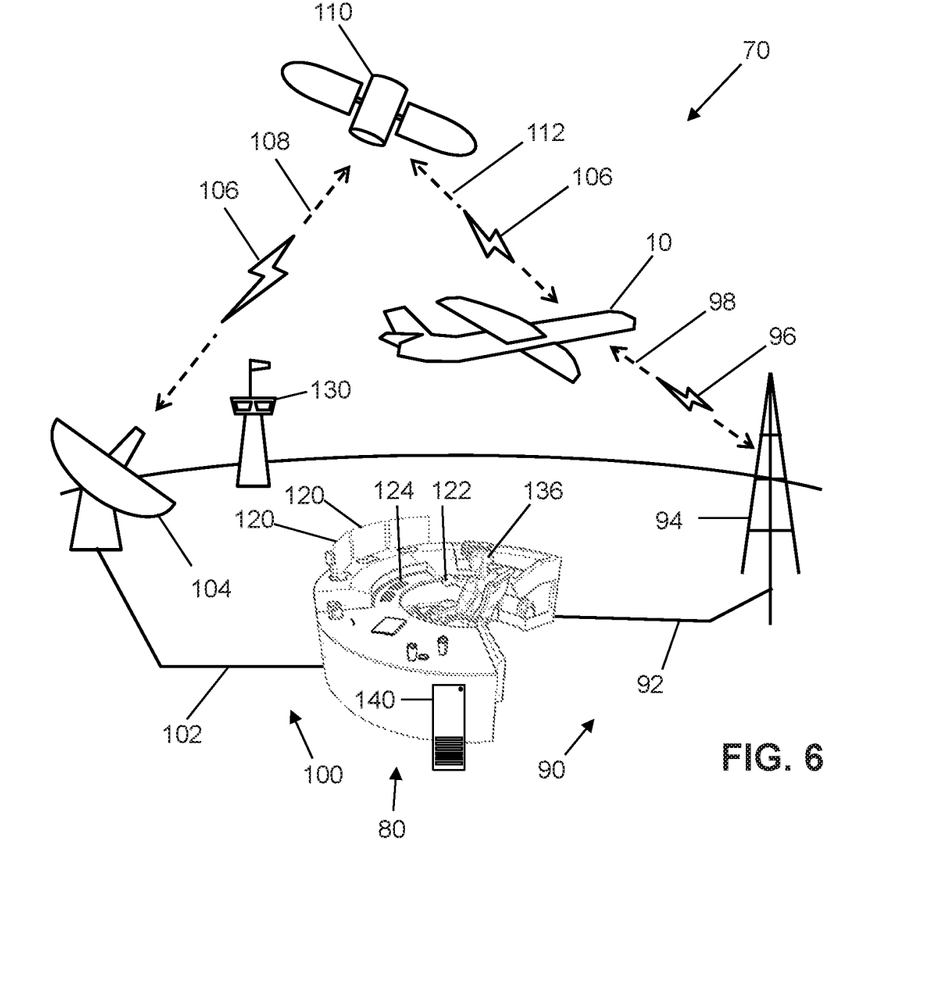
FIG. 6 is a perspective view of a system in which a ground-based pilot assumes copilot role for the aircraft of FIGS. 3-4, for example as a pilot rests.

Aspects of a system 70 (FIG. 6), for both onboard piloting and remote piloting of the aircraft 10, can now be described, with advantages thereof being particularly beneficial in view of the FIGS. 3-4, in which a pilot 36 rests in a fully reclined pilot seat 30. As shown in FIG. 6, a remote flight control system 80 is used to pilot the aircraft 10 cooperatively with at least one alert onboard pilot. The remote flight control system 80 is in electronic communication with the onboard flight control system 20 by way of a two-way communication channel including at least one wireless segment.

For example in FIG. 6, the remote flight control system 80 is linked in a first two-way communication channel 90, by a ground-based first link 92, to a land-to-air transceiver 94, which conveys two-way communications 96 between the remote flight control system 80 and the aircraft 10 by way of a wireless segment 98 of the first two-way communication channel 90. Additionally, in the system 70 as illustrated in FIG. 6, which represents a non-limiting example, the remote flight control system 80 is linked in a second two-way communication channel 100, by a ground-based second link 102, to a land-to-satellite transceiver 104, which conveys two-way communications 106 between the remote flight control system 80 and a communications satellite 110 by way of a wireless segment 108 of the second two-way communication channel 100. The communications satellite 110 further conveys the two-way communications to and from the aircraft by a wireless segment 112 of the second two-way communication channel 100.

By either or both of the first two-way communication channel 90 and second two-way communication channel 100, or by arrangement not expressly illustrated but suggested by these non-limiting examples, the onboard piloting system 70, at least in a remote piloting mode, transmits condition-related signals to the remote flight control system 80 and receives flight control signals from the remote flight control system.

The remote flight control system 80 as illustrated includes displays 120 such as LED and/or LCD displays that on which the computer system 140 graphically displays the flight condition indicators and aircraft system condition indicators. The remote flight control system 80 includes input devices by which or according to which flight control signals are generated by the remote flight control system and transmitted to the onboard flight control system. The input devices can include, as non-limiting examples, a joystick 122, for example in the form of a mouse in some embodiments, one or more keyboards 124, and one or more touch screens. The remote flight control system 80 can include audio output and audio input devices by which the remote pilot can maintain audio communications, such as voice communications, with the aircraft onboard pilots and/or land-based flight controllers as represented by a flight control tower 130 in FIG. 6.

For example, by way of the displays 120, the remote flight control system 80 includes or displays flight condition indicators, aircraft system condition indicators, and flight control devices for use by a remote pilot in remotely piloting the aircraft. The remote flight control system 80 includes an instrument panel, as represented by the displays 120, where many of the condition indicators and flight control devices are mounted, or graphically represented, to be readily accessible to a remote pilot 136. The remote flight control system 80, in the illustrated non-limiting example, graphically displays flight condition indicators and aircraft system condition indicators that respectively indicate flight and system conditions as conveyed by the received condition-related signals. While other arrangements are within the scope of these descriptions, the remote flight control system 80 of FIG. 6 is generally computer-based, and accordingly includes a computer system 140 such as a workstation, server, or PC.

The input devices, for example the joystick 122 in the form of a mouse or other input device, serve as remote flight control devices by which the aircraft 10 is remotely piloted. The remote flight control system 80, for example, may provide, to the remote pilot 136, any and all information available to onboard pilots. Thus, by use of the displays 120 and other benefits of the remote flight control system 80, the remote pilot 136 is presented a simulated or remote cockpit and flying presentation.

As one of the onboard pilots is resting, optionally screened by the partition wall as shown in FIG. 4, the remote third pilot can assume a piloting role, in particular serving as copilot in a non-limiting example. The remote pilot 136 may be simulated as placed into the cockpit 12 of the aircraft 10 by the use of respective virtual reality (VR) presentations within the cockpit and at the remote flight control system 80. For example, the displays 120 at the remote flight control system 80 may display the onboard alert pilot to the remote pilot 136. For example, the second pilot 46 may be displayed at the remote flight control system 80 as the first pilot 36 rests according to FIGS. 3-4. Similarly, displays at the onboard flight control system 20 and cockpit 12 may display the remote pilot 136 to the alert onboard pilot. For example, VR headrest displays may be used at one or each location. Thus, each alert pilot, both onboard and remote, may perceive the other pilot as present through VR presentation.

Accordingly, in various non-limiting examples, the system 70 is provided for both onboard piloting and remote piloting an aircraft 10 having thereon at least one onboard pilot. The aircraft in a typical example will have two onboard pilot, one of which may rest at a time as an alert onboard pilot is assisted by the remote pilot via the remote flight control system 80. The onboard flight control system 20 is operative to receive condition-related inputs from the onboard sensors 66, to activate the onboard condition indicators according to the received condition-related inputs.

The onboard flight control system 20 may have both an onboard piloting mode, in which onboard actuators are actuated according to the onboard flight control devices, thereby onboard piloting the aircraft, and a remote piloting mode. At least in the remote piloting mode, the onboard flight control system 20 transmits the condition-related signals from the onboard sensors 66 to the remote flight control system 80, and receives flight control signals from the remote flight control system 80. The onboard flight control system 20 may actuate, according to the flight control signals received from the remote flight control system 80, the onboard actuators 68 thereby remote piloting the aircraft 10.

The remote piloting mode may be entered upon either the onboard first pilot seat 30 or second pilot seat 40 being adjusted to a fully reclined position, indicating that an onboard pilot is at rest. Each onboard pilot seat can include a respective seat position sensor 58 (FIG. 4) in electronic communication with the onboard flight control system 20, with the onboard flight control system being operative to alert the remote flight control system 80 when the onboard pilot seat is adjusted to a reclined position. The onboard flight control system 20 may be automatically operative in the remote piloting mode upon either onboard pilot seat being adjusted to a reclined position, for example a fully reclined position.

To assure that one onboard pilot is alert in an upright pilot seat, the first pilot seat 30 may be disposed in the reclined position thereof and the second pilot seat 40 may be disposed in the reclined position thereof at exclusive alternating times. Reclining both the first pilot seat 30 and the second pilot seat 40 may cause an alert action or alarm. The first pilot seat 30 and second pilot seat 40 may be prevented from reclining or fully reclining at once by interface and control of seat pivots using controlled adjusters or locks, for example by the onboard flight control system 20, or interlinked mechanisms of the seats.

In the remote piloting mode, a third pilot 136 may pilot the aircraft 10 cooperatively with the non-resting one of the onboard first pilot 36 and second pilot 46. The onboard flight control system 20 may automatically return to the onboard piloting mode when both the onboard first pilot seat 30 and second pilot seat 40 are returned to their upright positions. Thus, reclining either onboard pilot seat may automatically switch the onboard flight control system 20 from the onboard piloting mode to the remote piloting mode, and returning the reclined onboard seat to its upright position may automatically switch the onboard flight control system to the onboard piloting mode.

The onboard sensors 66 relay information, via the onboard flight control system 20 and one or more communication channels (90,100), to the computer system 140 of the remote flight control system 80, which has a processor where software is used to analyze the data received to confirm and indicate flight conditions and aircraft system conditions. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor of the computing system 140 executes software instructions and may be any custom made or commercially available processor, a central processing unit (CPU), an auxiliary processor among several processors associated with the server, a semiconductor-based microprocessor (in the form of a microchip or chip set), or generally any device for executing software instructions. When in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the displays, an aircraft network as represented by the flight control tower 130 in FIG. 6, and flight crew accessible devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the computer system 140 to communicate on a network, such as the Internet, a wide area network (WAN), a local area network (LAN) such as a secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

To achieve reliability and direct connection, military communication protocols may be used, such as protocols used to control an unmanned aerial vehicle (UAV), and channeled to the remote flight control system 80 and remote pilot 136. Communication protocols of the system for remotely piloting of the aircraft 10 with high security may be military grade while serving a civilian based aviation system. Remote flight control of the aircraft may be used to improve flight safety and security against incidents where smoke, low oxygen, or other health issues are problematic in the cockpit. Remote flight control of the aircraft 10 may be used in the event of a terrorist situation. The standard Extended Twin Operations (ETOPs), which describes an operation in which air carriers are allowed to fly an extended range over distances where airports and landing areas are sparse, such as long routes over the ocean, may be met by the system with improved security and crew redundancy by way of one or more remote pilots.

The system 70 can increase the effective range of long-range aircraft without major changes to cabin installations onboard. In use with an aircraft that can fly long range, for example ten hours or more, the system 70 can be used to relieve onboard flight crew members in compliance with maximum flight times for a pilot during a day according to aviation regulations or airline operator standards. This means that point to point airport pairs that were previously connected via non-directed routes can now be directly connected in a single flight. For example, Dallas Fort Worth and Frankfort airports can be directly connected, whereas only flights between the east coast of the US and restricted locations in Europe were previously made by commercial passenger airline operators.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A system for both onboard piloting and remote piloting an aircraft having thereon at least one onboard pilot, the system comprising:
   an aircraft including an onboard first pilot seat and an onboard second pilot seat each adjustable between an upright position and a reclined position, onboard sensors, onboard actuators, and an onboard flight control system, the onboard flight control system including onboard flight control devices and onboard condition indicators mounted proximal the first pilot seat and the second pilot seat; and
   a remote flight control system in electronic communication with the onboard flight control system by way of a two-way communication channel including at least one wireless segment, the remote flight control system including remote flight control devices and remote condition indicators;
   wherein, the onboard flight control system is operative to receive condition-related inputs from the onboard sensors, to activate the onboard condition indicators according to the received condition-related inputs, and:
      at least in an onboard piloting mode, to actuate the onboard actuators according to the onboard flight control devices, thereby onboard piloting the aircraft; and
      at least in a remote piloting mode, transmit the condition-related signals to the remote flight control system, to receive flight control signals from the remote flight control system, and to actuate, according to the flight control signals received from the remote flight control system, the onboard actuators thereby remote piloting the aircraft;
   wherein, the onboard flight control system is further operative to enter the remote piloting mode upon either the first pilot seat or the second pilot seat being adjusted to a fully reclined position, and
   wherein, only one of the first pilot seat and the second pilot seat is able to be reclined at a time.

2. The system of claim 1, wherein the remote flight control system includes at least one display on which the remote condition indicators are graphically displayed.

3. The system of claim 1, wherein the aircraft further includes a partition wall deployable between the first pilot seat and second pilot seat.

4. The system of claim 3, wherein the partition wall stows automatically as either of the first pilot seat and second pilot seat is adjusted from the reclined position thereof to the upright position thereof.

5. The system of claim 1, wherein, at least in the remote piloting mode, the remote pilot is simulated as placed into the aircraft by a virtual reality (VR) presentation viewable at the second pilot seat.

6. The system of claim 1, wherein the remote piloting system is used to extend the range of the aircraft by permitting a first pilot in the first pilot seat and a second pilot in the second pilot seat to alternately rest as a third pilot at the remote flight control system pilots the aircraft cooperatively with the non-resting one of the first pilot and second pilot.

7. The system of claim 1, wherein at least one of the first pilot seat and the second pilot seat comprises a seat position sensor in electronic communication with the onboard flight control system, and wherein the onboard flight control system is operative to alert the remote flight control system when the at least one of the first pilot seat and the second pilot seat is adjusted to the reclined position.

8. An aircraft for both onboard piloting and remote piloting, the aircraft comprising:
   an onboard first pilot seat adjustable between an upright position and a reclined position;
   an onboard second pilot seat adjustable between an upright position and a reclined position;
   multiple onboard sensors;
   multiple onboard actuators; and
   an onboard flight control system including onboard flight control devices and onboard condition indicators mounted proximal the first pilot seat and the second pilot seat, the onboard flight control system in electronic communication with a remote flight control system by way of a two-way communication channel including at least one wireless segment, the remote flight control system including remote flight control devices and remote condition indicators,
   wherein; the onboard flight control system is operative to receive condition-related inputs from the onboard sensors, to activate the onboard condition indicators according to the received condition-related inputs, and:
      at least in an onboard piloting mode, to actuate the onboard actuators according to the onboard flight control devices, thereby onboard piloting the aircraft; and
      at least in a remote piloting mode, transmit the condition-related signals to the remote flight control system, to receive flight control signals from the remote flight control system, and to actuate, according to the flight control signals received from the remote flight control system, the onboard actuators thereby remote piloting the aircraft;
   wherein, the onboard flight control system is further operative to enter the remote piloting mode upon either the first pilot seat or the second pilot seat being adjusted to a fully reclined position, and
   wherein, only one of the first pilot seat and the second pilot seat is able to reclined at a time.

9. The aircraft of claim 8, wherein the aircraft further includes a partition wall deployable between the first pilot seat and second pilot seat.

10. The aircraft of claim 9, wherein the partition wall stows automatically as either of the first pilot seat and second pilot seat is adjusted from the reclined position thereof to the upright position thereof.

11. The aircraft of claim 8, wherein, at least in the remote piloting mode, the remote pilot is simulated as placed into the aircraft by a virtual reality (VR) presentation viewable at the second pilot seat.

12. The aircraft of claim 8, wherein the remote piloting system is used to extend the range of the aircraft by permitting a first pilot in the first pilot seat and a second pilot in the second pilot seat to alternately rest as a third pilot at the remote flight control system pilots the aircraft cooperatively with the non-resting one of the first pilot and second pilot.

13. The aircraft of claim 8, wherein each of the first pilot seat and the second pilot seat comprises a seat position sensor in electronic communication with the onboard flight control system, and wherein the onboard flight control system is operative to alert the remote flight control system when the at least one of the first pilot seat and the second pilot seat is adjusted to the reclined position.

14. The aircraft of claim 8; wherein each of the first pilot seat and the second pilot seat comprises a backrest pivotally adjustable from the upright position to a fully reclined approximately horizontal position.

\* \* \* \* \*